United States Patent Office 2,893,638
Patented July 7, 1959

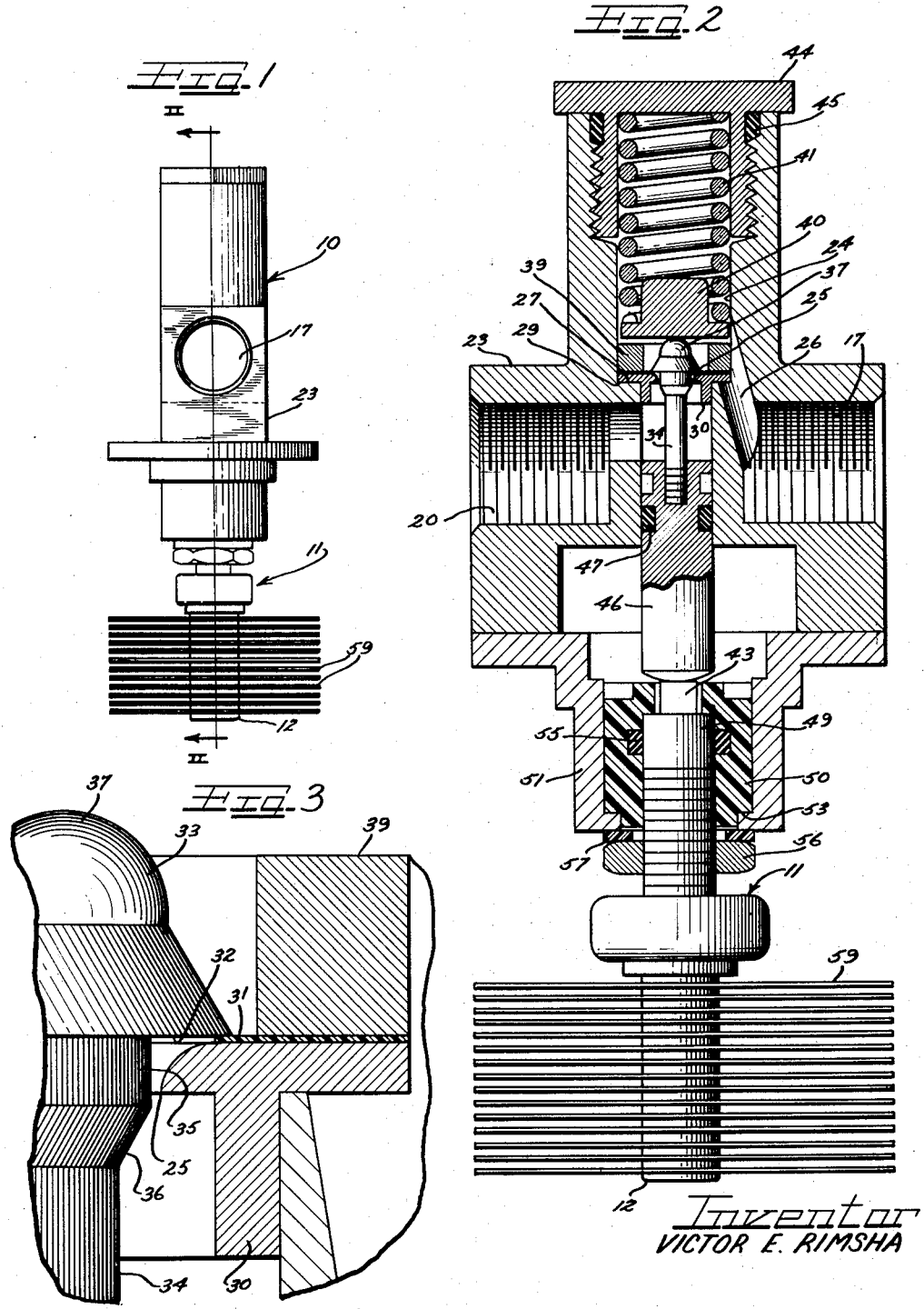

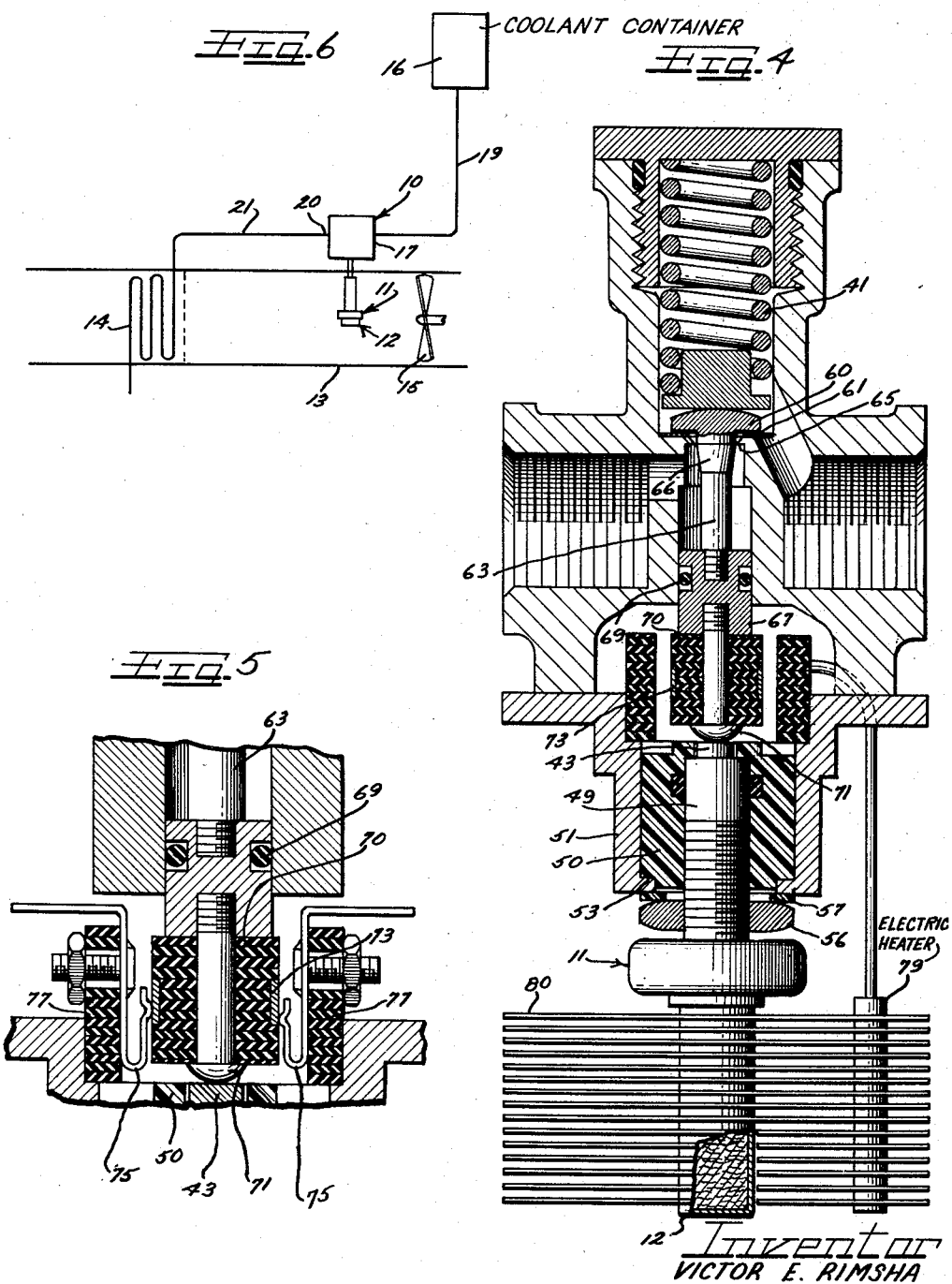

2,893,638
THERMOSTATIC CONTROL VALVE

Victor E. Rimsha, Van Nuys, Calif., assignor to The Dole Valve Company, Morton Grove, Ill., a corporation of Illinois Application August 9, 1957, Serial No. 677,240

3 Claims. (Cl. 236—68)

This invention relates to improvements in thermostatic modulating valves of a type particularly adapted to regulate the flow of a coolant in accordance with the temperature of the outside air.

A principal object of the invention is to provide a simple form of thermostatic valve in which the flow of fluid through the valve is regulated in accordance with the temperature of air sensed by the valve.

A further object of the invention is to provide a simple form of thermostatically controlled modulating valve sensing the temperature of air passing through a heat exchanger and regulating the flow of coolant through the heat exchanger in accordance with the temperature of the air sensed.

A still further object of the invention is to provide a thermostatically controlled modulating valve having a thermal element in the flow path of air flowing through a heat exchanger and regulating the flow of coolant through the heat exchanger in accordance with the temperature of the air flowing therethrough.

A still further object of the invention is to provide a simplified form of modulator valve in which a poppet valve seats against a seat on the upstream side of a port, in which the stem of the valve extends through the port and has flow control characteristics contoured therein and cooperating with the port, to vary the flow in accordance with the temperature changes of air on the outside of the valve, and in which a thermal element insulated from the valve body and sensing the temperature of air flowing thereover on the outside of the valve body is provided to operate the valve to increase the flow of coolant therethrough, as the temperature of the air rises.

A still further object of the invention is to provide a thermal element so arranged as to accurately sense the temperature of air passing thereover.

A further object of the invention is to provide an electrically heated thermal element in which a plurality of fins extend about the casing of a thermal element in heat transfer relation with respect thereto, and in which an electrically energizable heater serves to heat the fins and thereby heat the thermal element to effect operation thereof.

A still further object of the invention is to provide a simple and effective system for controlling the flow of refrigerant through a heat exchanger in accordance with the temperature of air drawn through the heat exchanger.

These and other objects of the invention will appear from time to time as the following specification proceeds and with reference to the accompanying drawings wherein:

Figure 1 is an end view of a modulating valve constructed in accordance with the invention;

Figure 2 is a longitudinal sectional view taken through the valve substantially along line II—II of Figure 1;

Figure 3 is an enlarged fragmentary detail sectional view of the control valve, showing the poppet seated on its seat;

Figure 4 is a longitudinal sectional view taken through a modified form of valve constructed in accordance with the invention;

Figure 5 is an enlarged detailed fragmentary sectional view, illustrating the switch means controlling the energization of the heater for the thermal element; and Figure 6 is a diagrammatic view illustrating a coolant control system, and one manner in which the valve of the invention may be utilized.

In the embodiment of the invention illustrated in the drawings, I have shown in Figures 1 and 6, a modulating valve 10 operated by a thermal element 11 having a casing 12 containing a thermally expansible material and positioned in a duct 13 in the flow of path of air passing through a heat exchanger 14. The heat exchanger 14 is located within the duct 13 and serves to maintain the temperature of the air flowing through the duct at a constant temperature. As herein shown, the air is drawn through the duct 13 by a fan 15, shown as being located within said duct and drawing the air through the duct at a high velocity, which may be in the order of 3200 feet per minute. The valve 10 controls the flow of coolant through the heat exchanger 14, which may be liquid ammonia contained within a container 16, and flowing to an inlet 17 of the valve through a pipe 19 and flowing from an outlet 20 of the valve through a pipe 21 connected with the heat exchanger 14. The application just described may be for a guided missile or a like device, where it is desired to maintain the temperature of the rapidly flowing air flowing through the heat exchanger 14 at a predetermined temperature for short periods of time, as for example between 120 and 130° F. The ammonia supply for such application is furnished in a bottle or container and after the container is exhausted the fuel of the missile has been spent.

Referring now in particular to the valve 10, said valve comprises a valve body 23 having the inlet 17 leading thereinto, and an outlet 20 leading therefrom. A passageway 26 connects the inlet 17 with a chamber 24 on the upstream side of a sharp edged flow orifice 25.

The flow orifice 25 is shown as being formed in an annular insert 27 seated on an annular shoulder 29 at the lower end portion of the chamber 24. The insert 27 also has an integrally formed collar 30 spaced inwardly of the orifice 25 and having communication with the outlet 20.

The insert 29 is shown as having an annular shut-off seat 31 extending about the upper face thereof and engaged by a valve face 32 of a shut-off valve 33, herein shown as being a poppet type of shut-off valve. The shut-off valve 33 has a contoured stem 34 extending in a downstream direction from the valve through the orifice 25.

The shut-off seat 31 is preferably made from Teflon or a like material providing a positive shut-off of flow through the valve and accommodating instantaneous opening of the valve without the usual delay present with resilient seats, which move with the valve before it becomes unseated.

The stem 34 is shown as having a generally cylindrical enlarged diameter portion 35 extending downwardly of the valve face 32 through the orifice 25 and terminating into a converging frusto-conical wall portion 36 cooperating with the sharp edge of the orifice 25, to control the flow of fluid through the orifice in accordance with the position of the stem 34 along said orifice.

The instant the valve 32 rises above the seat 31, the valve will present no further resistance to the flow of fluid through the sharp orifice 25. The enlarged diameter portion 35 is so proportioned with respect to the orifice 25 as to give approximately 25% of the rated flow of the valve as soon as the valve opens. When the tapered wall 36 of the stem 34 comes into registry with the sharp edge orifice 25 the flow will be controlled by the annular space between the tapered wall and the orifice 25, the flow increasing as the valve moves away from the seat 31 and reaching its rated flow as the reduced diameter end of the tapered wall 36 passes upwardly of the orifice 25. Where it is desired to retain the temperature of the air between 120 and 130°, as the temperature of the air rises to approximately 128° the valve will deliver its maximum flow rate until the temperature of the air may be reduced for some reason or other.

The valve 33 has a generally semi-spherical head 37 extending upwardly above a collar 39, which may be press fitted within the chamber 24 and retains the Teflon seat 31 to the insert 29. The semi-spherical head 37 is shown as being engaged by a seating member 40 for a return spring 41 for a power member 43 of the thermal element 11. The return spring 41 is seated at its upper end within an end cap 44, threaded within the chamber 24 and sealed thereto as by an annular seal 45.

The stem 34 is shown in Figure 2 as being threaded within a plunger 46 slidably guided for movement along the valve body 23 and sealed thereto as by an O-ring 47. The outer end of the extension 46 abuts the end of the power member 43 of the thermal element 11 and effects movement of the valve 32 in a valve opening direction upon extensible movement of the power member 43 with respect to a cylinder 49 of the thermal element.

The thermal element 11 is shown as being a well known form of wax or power type of thermal element of the same general type as shown and described in Patent No. 2,368,181 which issued to Sergius Vernet on January 30, 1945. The casing 12 of the thermal element contains a fusible thermally expansible material, which may be a wax containing a powered metal heat conductor and a binder, and is shown as being relatively along to provide sufficient surface area to render said thermal element sensitive to changes in temperature of the air flowing over the thermal element. The fusible thermally expansible material in the casing 12 reacts against a flexible diaphragm (not shown) to extend the power member 43 from the end of the cylinder 49 as the temperature to which the casing 12 is subjected reaches the fusion point of the thermally expansible material.

The cylinder 49 is shown as being threaded within a bushing 50 carried in a lower body part 51 of the valve body 23. The bushing 50 is shown as being of a substantial length and as being seated on an annular shoulder 53 at the lower end of the lower body part 51, and as being sealed to the cylinder 49 as by a seal 55. The bushing 50 serves as an insulator to insulate the thermal element from the valve body, cooled by the liquid ammonia flowing through the valve, and may be made from nylon or a like insulating material. The thermal element is locked to the bushing 50 as by a lock nut 56 threaded on the cylinder 49 and pressing an insulating washer 57 against the end of the body part 51.

The thermal element 11 besides having an elognated casing to increase the conduction of heat to the fusible thermally expansible material contained within the casing 12, has a plurality of relatively thin heat conducting fins 59 mounted on said casing and extending therealong for substantially the length thereof. The fins 59 are of a relatively large diameter and may be made from a suitable heat conducting material, such as, aluminum, copper or any other material having high heat conductivity.

The thermal element 11 insulated from the relatively cold valve body by the insulating bushing 50, and having a long casing with spaced thin heat conducting fins mounted thereon, thus provides a quick response to changes in temperature of the air modulating the flow of liquid ammonia through the heat exchanger 14, to efficiently maintain the temperature of the air passing along duct 13 through the heat exchanger at the substantially constant temperature required.

In the modified form of the invention shown in Figures 4 and 5, the valve body, valve and thermal element are substantially the same as the valve body, valve and thermal element shown in Figures 1, 2 and 3, so the same reference characters will be applied to the same parts in each figure, and the valve body and valve itself need not herein be shown or described in detail.

As shown in Figures 4 and 5, a poppet valve 60 operating on principles similar to the poppet valve 33 is seated on a Teflon seat 61 by the bias of a return spring 41 for the valve. The valve 60 has a stem 63 extending through a sharp or knife edge orifice 65, and having a tapered flow control portion 66 cooperating with the sharp orifice 65 and increasing the flow through said orifice 65 upon extensible movement of the power member 43 of the thermal element 11 for the valve. The stem 63 is shown as being threaded within a spacer 67 sealed to the valve body as by an O-ring 69. A plurality of insulator disks 70 abut the bottom of the spacer 67 and are secured thereto in stacked relation with respect to each other as by a machine screw 71 extending through said disks and threaded in the spacer 67, and abutting the end of the power member 43 of the thermal element 11 at its head. The insulator disks 70 are shown as having a contact 73 extending thereabout and recessed therein for engagement with contacts 75 mounted on spaced insulators 77, mounted within the lower body part 51. The contacts 75 complete an energizing circuit to a resistor heater 79 for heating the casing 12 of the thermal element 11 when in engagement with the contact 73, when the thermal element 11 is cold. The resistor heater 79 is shown as extending through and as being suitably secured to spaced thin heat conducting fins 80 mounted on the casing 12 for the thermal element 11.

The thermal element 11 is mounted in the body part 15 and insulated therefrom by an insulating bushing 50 and is locked in position on said body part by a lock nut 56 engaging an insulating washer 57 with the bottom of the body part 51.

When the valve 60 is closed and the thermal element 11 is cold with the power member 43 in its retracted position within the cylinder 49, a circuit will be completed through the contacts 75 and 73 to the resistor heater 79. This will effect heating of the casing 12 of the thermal element and extensible movement of the power member 43 thereof to open the valve 61. As soon, however, as the valve opens, the circuit to the resistor heater 79 will open. The control of the valve will then be by the temperature of the air passing along the heat exchanger 14, as in the form of my invention shown in Figures 1, 2 and 3, except in cases where the valve may move to its fully closed position for one reason or another, at which time the resistor heater 79 will again be energized to effect heating of the thermal element 11 and opening of the valve.

If desired, other contacts (not shown) may be provided to effect the lighting of indicator lights indicating when the valve is in its opened and closed positions.

It should here be understood that a manually operable switch (not shown) may also be provided to manually close the energizing circuit to contacts 75 and the resistor heater 79.

While I have herein shown and described several forms in which my invention may be embodied, it should be understood that various modifications and variations in the present invention may be effected without departing from the spirit and scope of the novel concepts thereof.

I claim as my invention:

1. In a thermostatically controlled modulating valve, a valve body, an inlet into said valve body, an outlet from said valve body, an orifice between said inlet and said outlet, an annular flat valve seat extending about said orifice, a poppet valve having a valve face cooperating with said seat, spring means engaging said valve with said seat, a thermal element moving said valve away from said seat upon predetermined rises in temperature, said valve having a contoured stem extending through said orifice and cooperating with said orifice to increase the rate of flow of fluid therethrough upon predetermined temperature rises, said thermal element having a casing on the outside of said valve body containing a thermally expansible material for sensing the temperature of air flowing about said valve, a cylinder extending from said casing within said valve body, a power member extensible from said cylinder within said valve body upon fusion of the thermally expansible material within said casing, means mounting said thermal element on said valve body, electrically energizable means associated with said thermal element to heat said thermal element and effect the extensible movement of said power member and opening of said valve, a switch completing an energizing circuit to said electrically energizable means when said power member is in a retracted position and operated by extensible movement of said power member to deenergize said electrically energizable means and to accommodate the control of said valve by the ambient temperature of the air to which said thermal element is subjected.

2. A thermostatic valve particularly adapted to regulate the flow of a refrigerant through a heat exchanger in accordance with the temperature of air passing through the heat exchanger, comprising a valve body, an inlet into said valve body, an outlet from said valve body, a sharp orifice between said inlet and said outlet, a flat annular valve seat upstream of said orifice and extending thereabout, a valve having a flat valve face engageable with said seat, spring means engaging said valve face with said seat, a thermal element sensing the temperature of the air on the outside of said valve body for opening said valve, said valve having a stem extending from the valve face thereof through said orifice and contoured to increase the rate of flow through said orifice as said valve moves away from said seat, said thermal element comprising a casing containing a fusible thermally expansible material, a cylinder mounted in said valve body and a power member extensible from said cylinder within said valve body upon predetermined rises in temperature, to effect opening of said valve and the regulation of the rate of flow of fluid through said orifice in accordance with the position of said stem with respect to said orifice, a plurality of thin heat conducting fins on the casing for said thermal element, a resistor heater mounted on said fins, a switch operated by extensible movement of said power member and having contacts closing an energizing circuit to said resistor heater when said thermal element is cool, to heat said thermal element and initially opening said valve, said contacts opening to open the circuit to said resistor heater as said valve opens and accommodating the control of said valve by the ambient temperature of the air about said thermal element.

3. A thermostatic valve particularly adapted to regulate the flow of a refrigerant through a heat exchanger in accordance with the temperature of air passing through the heat exchanger, comprising a valve body, an inlet into said valve body, an outlet from said valve body, a sharp orifice between said inlet and said outlet, a flat annular valve seat upstream of said orifice and extending thereabout, a valve having a flat valve face engageable with said seat, spring means engaging said valve face with said seat, a thermal element sensing the temperature of the air on the outside of said valve body for opening said valve, said valve having a stem extending from the valve face thereof through said orifice and contoured to increase the rate of flow through said orifice as said valve moves away from said seat, said thermal element comprising a casing containing a fusible thermally expansible material, a cylinder mounted in said valve body and a power member extensible from said cylinder within said valve body upon predetermined rises in temperature, to effect opening of said valve and the regulation of the rate of flow of fluid through said orifice in accordance with the position of said stem with respect to said orifice, and a heat insulator mounting said cylinder in said valve body and insulating said thermal element therefrom, a plurality of thin heat conducting fins on the casing of said thermal element, a resistor heater mounted on said fins for heating said thermal element, a switch having contacts closing an energizing circuit to said resistor heater when said thermal element is cool to effect heating of said thermal element and to initially open said valve, said contacts being operated to an open position by extensible movement of said power member to open the circuit to said resistor heater as the valve opens and to thereby accommodate the control of said valve by the ambient temperature of air about said thermal element.

References Cited in the file of this patent

UNITED STATES PATENTS

| | | |
|---|---|---|
| 1,404,844 | Fulton | Jan. 31, 1922 |
| 1,987,948 | Smith | Jan. 15, 1935 |
| 2,308,861 | Clifford | Jan. 19, 1943 |
| 2,381,215 | Hahn | Aug. 7, 1945 |
| 2,489,896 | Kempton | Nov. 29, 1949 |
| 2,532,896 | Dillman | Dec. 5, 1950 |
| 2,696,967 | Wilson | Dec. 14, 1954 |
| 2,754,661 | Coyne | July 17, 1956 |
| 2,781,979 | Kraft | Feb. 19, 1957 |
| 2,797,701 | Nurkiewicz | July 2, 1957 |

OTHER REFERENCES

"Instruments" Magazine, pp. 54, 55 and 56, March 1934.